(12) United States Patent
Tatsumi

(10) Patent No.: US 7,211,298 B2
(45) Date of Patent: May 1, 2007

(54) ELECTROSTATICALLY FIBER PLANTED STEEL SHEET AND PRODUCTION PROCESS THEREFOR

(75) Inventor: Teruyuki Tatsumi, Tokyo (JP)

(73) Assignee: Sumitomo Corporation, Tokyo (JP)

( * ) Notice: Subject to any disclaimer, the term of this patent is extended or adjusted under 35 U.S.C. 154(b) by 0 days.

(21) Appl. No.: 10/446,379

(22) Filed: May 29, 2003

(65) Prior Publication Data
US 2003/0205073 A1 Nov. 6, 2003

Related U.S. Application Data

(62) Division of application No. 09/635,662, filed on Aug. 10, 2000, now abandoned.

(30) Foreign Application Priority Data

Aug. 10, 1999 (JP) ............................... P11-226889

(51) Int. Cl.
*B05D 1/16* (2006.01)
(52) U.S. Cl. ..................................... 427/464; 427/462
(58) Field of Classification Search ........ 427/462–464; 428/90, 96–97
See application file for complete search history.

(56) References Cited

U.S. PATENT DOCUMENTS 3,502,207 A * 3/1970 Rollin ..................... 428/40.9
3,529,986 A * 9/1970 Kappas et al. ............... 427/462
3,591,403 A * 7/1971 Sheehan ...................... 427/463
4,218,501 A * 8/1980 Kameya et al. ................ 428/90
4,362,773 A * 12/1982 Shikinami .................... 428/90
4,734,307 A * 3/1988 Thorsrud ..................... 428/90
4,963,422 A * 10/1990 Katz et al. .................... 428/90

FOREIGN PATENT DOCUMENTS

| CA | 452 052 | * 10/1948 |
| CA | 452052 | * 10/1948 |
| EP | 0 050 102 | * 10/1981 |
| EP | 0 050 102 | 4/1982 |

* cited by examiner

*Primary Examiner*—Fred J. Parker
(74) *Attorney, Agent, or Firm*—Browdy and Neimark, PLLC

(57) ABSTRACT

A fiber planted steel sheet obtained by forming only a fiber planting layer having excellent adhesion to a substrate made from a composition having special composition on the surface of a surface treated steel sheet as a substrate without forming a primer of a polyester synthetic resin containing an anticorrosive pigment and the like and electrostatically planting short fibers in the planting layer. Therefore, the electrostatically fiber planted steel sheet is produced by coating an aqueous adhesive composition for planting fibers comprising an emulsion resin having a glass transition temperature of −40 to 40° C., aqueous coloring pigment dispersion, defoamer and pH modifier on the surface of the surface treated steel sheet to form a fiber planting layer having excellent adhesion to the steel sheet on the surface of the steel sheet and electrostatically planting short fibers while the surface of the planting layer retains adhesion.

7 Claims, 1 Drawing Sheet

ELECTROSTATICALLY FIBER PLANTED STEEL SHEET AND PRODUCTION PROCESS THEREFOR

Figure 1:
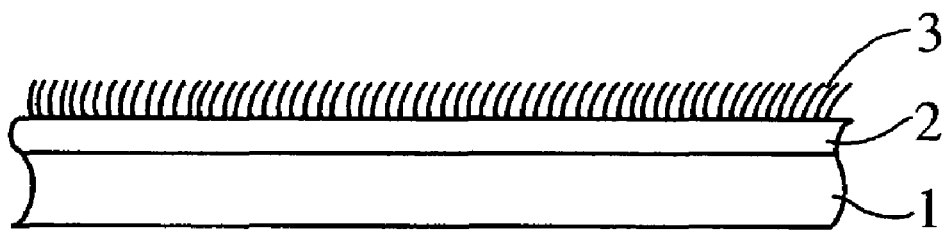

This is a division of prior application Ser. No. 09/635,662 filed Aug. 10, 2000, now abandoned in favor of the present application.

BACKGROUND OF THE INVENTION

1. Field of the Invention

The present invention relates to a fiber planted steel sheet comprising a surface treated steel sheet or the like as a substrate, a fiber planting layer which is directly formed on the substrate without a primer made from a synthetic resin containing an anticorrosive pigment formed on the substrate and an electrostatically short fiber planted layer formed on the planting layer and to a production process therefor.

2. Description of the Prior Art

As a prior art to the present invention, there is known a fiber planted steel sheet to be formed which is produced by degreasing the surface of a steel sheet, subjecting it to a chemical conversion treatment with chromic acid to improve adhesion between the steel sheet and a polyester synthetic resin, forming a polyester synthetic resin layer containing an anticorrosive pigment on this surface treated steel sheet, forming on part or all of the surface of the resin layer a reactive acrylic adhesive layer having flexibility which is not broken, cracked or separated at the time of drawing or bending and planting synthetic resin piles on this adhesive layer electrostatically (for example, Japanese Patent Publication No. 27864/1987).

There are known a fiber planted steel material produced by subjecting the surface of an H type steel, steel tube, sheet pile or steel sheet used as a construction steel material to a rust removal treatment with a shot blast, grinder, belt sander or the like, coating it with an acrylic urethane-based adhesive and planting non-metal fibers while it is uncured and a production process therefor (for example, Japanese Patent Disclosure No. 138813/1993).

It is known that a chemical conversion coating film is formed by treating both sides of aluminum or an alloy thereof with chromic acid or chromium phosphate, the film is coated with an acrylonitrile-butadiene copolymer rubber emulsion adhesive and fibers such as nylon pile are planted on this film (Japanese Patent Disclosure No. 34778/1972).

As a prior art related to an electrostatic planting adhesive for a weather strip member used in lower and upper opening/closing portions of car window glass, there is known an adhesive which comprises 100 parts by weight of an ethylene-vinyl acetate copolymer, 1 to 30 parts by weight of a non-yellowing urethane prepolymer (this polymer is a non-yellowing polyisocyanate resin used as a curing agent for an ethylene-vinyl acetate copolymer), 0.1 to 5 parts by weight of a glycidyl silane coupling agent and 0.01 to 5 parts by weight of a wetting agent (Japanese Patent Disclosure No. 145635/1994).

The present applicant proposes an electrostatically fiber planted steel sheet produced by forming a fiber planting layer of a fiber bonding aqueous coating composition comprising an aqueous epoxy modified polyurethane resin, aqueous acidic black dye, antifoaming agent and pH modifier formed on the surface of a surface treated steel sheet and an electrostatically fiber planted layer of organic short fibers on the planting layer (Japanese Patent Disclosure No. 258472/1998).

The above proposal of the present applicant has such an economical problem that an expensive polyurethane resin must be used though an extra step of forming a primer such as a polyester synthetic resin containing an anticorrosive pigment or the like can be eliminated. Since a disperse solvent other than water is separated at the time of drying the fiber bonding aqueous coating composition when a polyurethane resin is used in the fiber bonding aqueous coating composition, means of collecting the disperse solvent is required, resulting in a bulky apparatus.

The present invention provides an electrostatically fiber planted steel sheet produced by using a surface treated steel sheet such as a commercially available galvanized steel sheet (including products treated with a chromate or coated with an organic or inorganic composite film containing no chromium) as a substrate, directly forming a fiber planting layer of an aqueous adhesive composition for planting fibers which is essentially composed of a specific aqueous emulsion resin on the surface of the substrate such as a steel sheet without a primer of a polyester synthetic resin containing an anticorrosive pigment in the prior art on the surface of the substrate, and electrostatically planting short fibers on this planting layer as well as a process for producing the same at a low cost.

SUMMARY OF THE INVENTION

The fiber planting layer of the present invention is improved to have excellent adhesion strength to a substrate such as a surface treated steel sheet and high flexibility. Therefore, when the fiber planted substrate is processed (for example, pressed or formed), the planting layer is not broken, cracked or separated.

The electrostatically fiber planted steel sheet of the present invention can be used as a raw material for construction material products such as ducts for the prevention of dripping of condensed dew and panels for the prevention of dripping of condensed dew, kitchen utensils, electric appliances, office equipment, car parts, toys, containers, casings and the like by using a surface treated steel sheet such as a commercially available galvanized steel sheet as a substrate and planting fibers in the steel sheet electrostatically.

The present invention also provides a fiber planted steel sheet by directly forming a fiber plating layer of an aqueous adhesive composition for planting fibers essentially composed of an aqueous emulsion resin having a specific glass transition temperature of −40 to 40° C. on the substrate without using an aqueous polyurethane resin containing a polar solvent, for example, a disperse solvent other than water such as N methylpyrrolidone and electrostatically planting short fibers in this planting layer as well as a process for producing the same at a low cost.

The emulsion resin which is the main ingredient of the aqueous adhesive composition for planting fibers forming the fiber planting layer of the present invention is mainly an acrylic emulsion or ethylene-vinyl acetate emulsion resin. Other emulsion resins such as a synthetic rubber emulsion typified by styrene-butadiene, vinyl chloride-based emulsion, vinylidene chloride-based emulsion, alkyd resin-based emulsion, polyester-based emulsion, phenolic resin-based emulsion and copolymer emulsions thereof may be used and the glass transition temperature of the main ingredient resin is limited to −40 to 40° C.

As for other components of the aqueous adhesive composition for planting fibers, 0 to 20 parts by weight of an aqueous pigment dispersion, 0 to 3 parts by weight of a defoamer, 0 to 5 parts by weight of a pH modifier, 0 to 25 parts by weight of a crosslinking agent, 0 to 10 parts by weight of a thickener, 0 to 20 parts by weight of a water-soluble resin and an emulsion resin having a glass transition temperature outside the above range are suitably mixed together based on 100 parts by weight of the above emulsion resin as required.

The planting operation is carried out in such a manner that the fiber planting voltage is controlled to 10 to 80 kV or the viscosity of the aqueous adhesive composition for planting fibers is adjusted to 200 to 20,000 cps/25° C. at the time of planting fibers to ensure that the roots of the short fibers are situated at an intermediate position of the fiber planting layer and the short fibers do not contact the surface of the surface treated steel sheet through the fiber planting layer.

Since the fiber planting layer made from the aqueous adhesive composition for planting fibers used in the electrostatically fiber planted steel sheet of the present invention has excellent adhesion strength to a substrate such as a steel sheet and high flexibility, it is not broken, cracked or separated when the fiber planted substrate is processed (pressed or formed). It also has excellent fiber adhesion that the planted short fibers do not fall off at the time of processing.

In the present invention, a fiber planting layer having high flexibility and excellent adhesion to a substrate can be formed on a substrate such as a steel sheet by coating a special aqueous adhesive composition for planting fibers on the surface of a surface treated steel sheet. Therefore, the coating layer is not broken, cracked or separated when the obtained fiber planted steel sheet product is processed such as drawn or bent and the planted short fibers do not fall off at the time of processing.

Since the electrostatically fiber planted steel sheet product planted with fibers using the aqueous adhesive composition for planting fibers of the present invention has excellent in not only processing but also the prevention of dripping of condensed dew, incombustibility and corrosion resistance, the fiber planted steel sheet product of the present invention can be used as a raw material for construction material products such as ducts for the prevention of dripping of condensed dew and panels for the prevention of dripping of condensed dew, kitchen utensils, electric appliances, office equipment, auto cars parts, toys, containers and casings.

Further, in the production of conventional electrostatically fiber planted steel sheets, a steel sheet is subjected to an electrostatic fiber planting treatment. In the production of the electrostatically fiber planted steel sheet of the present invention, a rolled surface treated steel sheet can be unrolled, straightened out, subjected to an electrostatic fiber planting treatment continuously and then wound up, it has an effect specific to the present invention that it can be slit into a thin belt and supplied as a raw material for rolled products such as a spiral tube.

Therefore, it is a first object of the present invention to make it possible to use a surface treated steel sheet such as a rolled galvanized steel sheet (including products treated with a chromate or coated with an organic or inorganic composite film containing no chromium) as a substrate for an electrostatically fiber planted steel sheet.

It is a second object of the present invention to provide an electrostatically fiber planted steel sheet produced by directly forming a fiber planting layer on a surface treated steel sheet as a substrate without a primer of a polyester synthetic resin containing an anticorrosive pigment or the like and electrostatically planting short fibers in this planting layer as well as a process for producing the same at a low cost.

It is a third object of the present invention to provide an electrostatically fiber planted steel sheet produced by directly forming a fiber planting layer of an aqueous adhesive composition for planting fibers which is essentially composed of a specified aqueous emulsion resin on a substrate such as a surface treated steel sheet and electrostatically planting short fibers in this planting layer as well as a process for producing the same at a low cost.

The above objects and advantages of the present invention will become more apparent from the following description when taken in conjunction with the accompanying drawings.

BRIEF DESCRIPTION OF THE ATTACHED DRAWINGS

Figure 2:
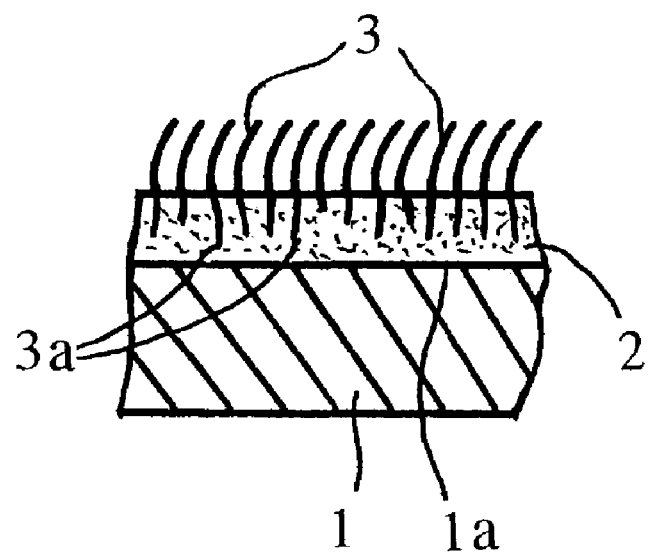

FIG. 1 is a side view of the cross section of an embodiment of a fiber planted steel sheet product obtained by the process of the present invention; and FIG. 2 is a partially enlarged sectional view for explaining the fiber planted state of the fiber planted steel sheet product shown in FIG. 1.

DESCRIPTION OF THE PREFERRED EMBODIMENTS

The surface treated steel sheet used in the present invention is a hot-dipped galvanized steel sheet, alloy-based hot-dipped steel sheet, electrically galvanized steel sheet, alloy electroplated steel sheet, precoated steel sheet or the like. The galvanized steel sheet includes products treated with a chromate or coated with an organic or inorganic composite film containing no chromium. The short fibers to be electrostatically planted in the fiber planting layer are chemical fibers such as regenerated fibers, semi-synthetic fibers or synthetic fibers, or natural fibers such as vegetable fibers, animal fibers, carbon fibers or glass fibers and may be either organic fibers or inorganic fibers.

An acrylic emulsion of the aqueous adhesive composition for planting fibers used in the electrostatically fiber planted steel sheet of the present invention is obtained by emulsion copolymerizing a monomer such as methyl methacrylate, ethyl methacrylate, isopropyl methacrylate, n-butyl methacrylate, isobutyl methacrylate, n-hexyl methacrylate, 2-ethylhexyl methacrylate, lauryl methacrylate, methacrylic acid, hydroxypropyl methacrylate, glycidyl methacrylate, acrylic acid, methyl acrylate, ethyl acrylate, isopropyl acrylate, n-butyl acrylate, 2-ethylhexyl acrylate, hydroxypropyl acrylate, hydroxybutyl acrylate, acrylic amide, N-methylol acrylamide, diacetone acrylamide, diacetone methacrylamide, styrene, vinyl toluene, acrylonitrile, methacrylonitrile or vinyl acetate in accordance with a conventionally known method.

The ethylene-vinyl acetate-based emulsion is obtained by conventionally known emulsion copolymerization or melting an ethylene-vinyl acetate resin which is a thermoplastic resin by heating and emulsifying it in water by a known method. Other emulsions are obtained by the known method.

Besides these main ingredients, an aqueous coloring pigment dispersion [example of trade product: Aqua Fine Color of Dainichi Seika Kogyosha Co.], defoamer [Defoamer of Sun Nopco Co.], pH modifier such as a tertiary amine, aqueous crosslinking agent for the functional group of an emulsion resin [oxazoline pendant resin, ethylene imine compound, carbodiimide compound, melamine resin, epoxy resin, amino resin, block isocyanate compound, metal salt compound, etc.], thickener [example of trade product: Primal of Rohm and Harse Co.], and water-soluble resin [alkyd resin-based, acrylic resin-based, styrene resin-based, epoxy resin-based, cellulose resin-based, etc.] are added as required.

Stated more specifically, as for the composition of the aqueous adhesive composition for planting fibers, 0 to 20 parts by weight of an aqueous coloring pigment dispersion, 0 to 3 parts by weight of a defoamer, 0 to 5 parts by weight of a pH modifier, 0 to 25 parts by weight of a crosslinking agent, 0 to 10 parts by weight of a thickener, 0 to 20 parts by weight of a water-soluble resin and an emulsion resin having a glass transition temperature outside the specified range are suitably mixed together based on 100 parts by weight of the emulsion resin having a specific transition temperature of −40 to 40° C. To blend them, they are stirred with a disperser for 5 to 10 minutes to adjust a pH value to 7.0 to 9.0 in the end. Although bubbles are formed right after production, the aqueous adhesive composition is used 2 to 3 hours after production. The emulsion resin having a specific transition temperature of −40 to 40° C. is mainly an acrylic emulsion resin or ethylene-vinyl acetate-based emulsion resin. Other emulsion resin such as a styrene-butadiene synthetic rubber-based emulsion, vinyl chloride-based emulsion, vinylidene chloride-based emulsion, alkyd resin-based emulsion, polyester-based emulsion, phenolic resin-based emulsion or copolymer emulsion thereof may be used.

In the present invention, an aqueous resin which is an emulsion resin having a specific transition temperature of −40 to 40° C. is used. This emulsion resin aqueous resin generally has an organic resin particle diameter of 0.1 µm or more, enables organic resin particles having a diameter of 0.01 to 0.1 µm to suspend in water and can keep the particles suspending in water stably by ionizing the particles or adding an emulsifier. Since this emulsion resin aqueous resin is an anionic self-emulsified organic resin and has a hydrophilic group which is an ionic functional group in the interior of its resin particle, the resin itself can suspend in water. As for the physical properties of the coating film, as resin particles emulsion suspending in water form a coating film through fusion polymerization, the coating film has excellent adhesion.

As for the characteristic properties of the aqueous adhesive composition for planting fibers used in the electrostatically fiber planted steel sheet of the present invention, since the composition is water-soluble, it has such an advantage that it is not necessary to use an organic solvent having high contamination properties. A coating layer having flexibility can be formed by applying an aqueous solution of this adhesive composition to a substrate with a roll coater, spray or applicator and the thickness of the coating layeraf ter drying is about 10 to 50 µm. Examples are provided to further illustrate the present invention.

EXAMPLE 1

FIG. 1 is a sectional view showing the structure of an electrostatically fiber planted steel sheet obtained by the production process of the present invention. In FIG. 1, reference numeral 1 is a surface treated steel sheet as a substrate, 2 an electrostatically fiber planting layer formed on the surface of the surface treated steel sheet 1 and coated with an adhesive composition, and 3 short fibers planted in the electrostatically fiber planting layer 2 by electrostatic fiber planting operation. In this Example, organic short fibers are planted as the short fibers 3.

To produce this electrostatically fiber planted steel sheet, an aqueous adhesive composition for planting fibers was first obtained by adding 1 part by weight of a defoamer, 0.5 part by weight of diethanolamine (pH modifier) and 5 parts by weight of an aqueous epoxy resin to 100 parts by weight of an acrylic emulsion (solid content of 55%) having a glass transition temperature of −20 ° C. obtained from methyl methacrylate and 2-ethylhexyl acrylate as main ingredients and stirring them with a disperser for 10 minutes.

This aqueous adhesive composition for planting fibers having a solid content of 55%, a viscosity of 2,000 cps/25° C. and a pH of 8.0 was coated on a surface treated steel sheet with a reverse roll coater in a wet state to 50 µm and organic short fibers of nylon 66 were planted immediately in the obtained coating layer using an electrostatic fiber planting apparatus (of Mesac Co.) at a voltage of 30 kV to form an electrostatically fiber planted layer.

In the above fiber planting operation, the above electrostatically fiber planted layer is such as shown in the enlarged sectional view of FIG. 2 that the voltage of the electrostatic fiber planting apparatus had to be controlled or the viscosity of the adhesive composition had to be adjusted to ensure that the roots 3a of the organic short fibers 3 were situated at an intermediate portion of the electrostatically fiber planting layer 2 and that the organic short fibers 3 did not contact the surface 1a of the surface treated steel sheet 1 as a substrate through the electrostatically fiber planting layer 2. This is because if the roots 3a of the planted organic short fibers 3 contacted the surface 1a of the surface treated steel sheet 1 through the electrostatically fiber planting layer 2, the electrostatically fiber planting layer 2 would be easily separated from the surface treated steel sheet 1 at the time of processing or use. After the organic short fibers 3 were planted as described above, the coating was forcedly dried in a direr at a temperature of 150 to 200° C. for 3 minutes to obtain an electrostatically fiber planted steel sheet product. A roll coater or applicator may be used to coat the adhesive composition on the surface treated steel sheet 1. The electrostatically fiber planted steel sheet shown in FIG. 1 is obtained by this operation.

EXAMPLE 2

As an alternative method different from that of Example 1, to produce an electrostatically fiber planted steel sheet, 15 parts by weight of an acrylic emulsion resin (solid content of 50%) having a glass transition temperature of 40° C. obtained by copolymerizing methyl methacrylate, n-butyl acrylate and hydroxypropyl acrylate, 0.5 part by weight of a defoamer, 1 part by weight of ammonia (pH modifier) and 3 parts by weight of aqueous block isocyanate were added to 100 parts by weight of an ethylene-vinyl acetate emulsion resin (solid content of 55%) having a glass transition temperature of −18° C. and stirred with a disperser for 10 minutes to obtain an aqueous adhesive composition for planting fibers.

This aqueous adhesive composition for planting fibers having a solid content of 52%, a viscosity of 5,000 cps/25° C. and a pH of 8.5 were coated on a surface treated steel sheet with a reverse roll coater in a wet state to 60 µm and organic short fibers of nylon 66 were planted immediately using an electrostatic fiber planting apparatus (of Mesac Co.) at a voltage of 40 kV to form an electrostatically fiber planted layer. Also in this Example 2, the same care as in Example 1 must be taken to plant fibers.

The results of a durability test made on the fiber planted steel sheet products obtained in the above Examples 1 and 2 in accordance with JIS-K-5400 (general coating test standard) and a scratch test not specified in JIS and conducted additionally on these products are shown in Table 1.

TABLE 1 performance of fiber planted steel sheet coating film

| item | test method and conditions | results of Example 1 | results of Example 2 |
|---|---|---|---|
| flex resistance | JIS-K-5400-8-1 using a 2 mm rod | passed | passed |
| adhesion/cross-cut test method | JIS-K-5400-8-5-1 number of bonded squares/100 (evaluation points) | 100/100 (10 points) | 100/100 (10 points) |
| impact resistance/ Dupont method | JIS-K-5400-8-3-2 weight of 500 g and height of 50 cm | passed | passed |
| Erichsen value/ breaking length method | JIS-K-5400-8-2-2 ŏ = 20 mm steel ball extrusion | passed | passed |
| moisture resistance test/fixed method | JIS-K-5400-9-2-1 40° C. × 95% or more RH × 240 hours | no abnormality | no abnormality |
| scratch test/coin method | observation of surface by scratching with 10 yen coin under load of 500 g | no abnormality | no abnormality | flex resistance: test for the examination of separation of an adhesive fiber planting layer by pressing an electrostatically fiber planted steel sheet against an iron bar having a diameter of 2 mm to bend it.

adhesion/cross-cut test method: test for the examination of separation of the adhesive fiber planting layer of the electrostatically fiber planted steel sheet by cross cutting the layer and affixing an adhesive tape to the layer.

impact resistance test/Dupont method: test for the examination of separation of the adhesive fiber planting layer by dropping a steel ball having a weight of 500 g and a radius of ½ from a height of 50 cm onto the electrostatically fiber planted steel sheet.

Erichsen value/breaking length method: test for the examination of separation of the adhesive fiber planting layer by pushing a steel ball having a diameter of 20±0.005 mm from the back of the electrostatically fiber planted steel sheet.

moisture resistance test/fixed method: test by leaving at a temperature of 40° C. and a humidity of 95% for 240 hours.

scratch test/coin method: test for the examination of separation of the surface by scratching with a 10 yen coin under a load of 500 g.

In the above description, the aqueous adhesive composition for planting fibers used in the electrostatically fiber planted steel sheet of the present invention comprises an aqueous polyurethane resin, aqueous acrylic resin, aqueous coloring pigment paste, thickener, defoamer and pH modifier. A fiber planted steel sheet can be produced by forming a coating layer from an aqueous adhesive composition for planting fibers comprising various components and planting short fibers in the layer.

While the preferred embodiments of the present invention have been described, it will be obvious to those skilled in the art that various preferred changes and modifications may be made without departing from the spirit of the invention and should be covered as fall within the scope of the invention.

What is claimed is:

1. A process for producing an electrostatically fiber planted steel sheet by a fiber planting operation, comprising:
    providing a surface treated steel sheet having a surface to be coated;
    directly coating the treated surface of said surface treated steel sheet with a roll coater, spray or applicator with an aqueous adhesive composition for planting fibers comprising an emulsion resin having a glass transition temperature of −40 to 40° C. as an essential ingredient and optionally comprising 0 to 20 parts by weight of an aqueous coloring pigment dispersion, 0 to 3 parts by weight of a defoamer, 0 to 5 parts by weight of a pH modifier, 0 to 25 parts by weight of a crosslinking agent, 0 to 10 parts by weight of a thickener and 0 to 20 parts by weight of a water-soluble resin added as optional components based on 100 parts by weight of the resin to form a fiber planting layer tightly adhered to the steel sheet on the surface of the steel sheet without a primer containing an anticorrosive pigment; and
    electrostatically planting fibers into the fiber planting layer while the surface of the fiber planting layer retains adhesion;
    wherein, the fiber planting operation is carried out such that the fibers are planted so that roots of said fibers are situated at an intermediate depth position of the fiber planting layer thickness; and
    a fiber planting voltage is controlled to 10 to 80 kV, and the viscosity of the adhesive composition for planting fibers is adjusted to 200 to 20,000 cps/25° C. to ensure that the fibers do not extend through the fiber planting layer and do not contact the surface of the surface treated steel sheet.

2. A process for producing an electrostatically fiber planted continuous steel sheet comprising:
    unrolling a rolled surface treated steel sheet having a surface to be coated, and straightening out the steel sheet;
    directly coating the treated surface of said steel sheet with a roll coater, spray or applicator, with an aqueous adhesive composition for planting fibers consisting of an emulsion resin having a glass transition temperature of −40 to 40° C. as an essential ingredient, 0 to 20 parts by weight of an aqueous coloring pigment dispersion, 0 to 3 parts by weight of a defoamer, 0 to 5 parts by weight of a pH modifier, 0 to 25 by weight of a crosslinking agent, 0 to 10 parts by weight of a thickener and 0 to 20 parts by weight of a water-soluble resin added as optional components based on 100 parts by weight of the resin to form a fiber planting layer tightly adhered to the steel sheet on the surface of the steel sheet without a primer of an anticorrosive pigment; and
    electrostatically planting fibers into the fiber planting layer while the surface of the fiber planting layer retains adhesion;
    winding up the extending steel sheet after the fibers have been electrostatically planted continuously on the surface of the steel sheet;
    wherein the fiber planting operation is carried out such that the fibers are planted so that roots of said fibers are situated at an intermediate depth position of the fiber planting layer thickness; and
    a fiber planting voltage is controlled to 10 to 80 kv, and the viscosity of the adhesive composition for planting fibers is adjusted to 200 to 20,000 cps/25° C. to ensure that the fibers do not extend through the fiber planting layer and do not contact the surface of the surface treated steel sheet.

3. A process for producing an electrostatically fiber planted continuous steel sheet comprising:
   (a) unrolling a rolled surface treated steel sheet having a surface to be coated, and straightening it out;
   (b) directly coating the treated surface of said steel sheet with a roll coater, spray or applicator and aqueous adhesive composition for planting fibers including an emulsion resin having a glass transition temperature of −40 to 40° C. as an essential ingredient, and an aqueous coloring pigment dispersion, a defoamer, a pH modifier, and a crosslinking agent on the surface to be coated of said surface treated steel sheet to form a fiber planting layer tightly adhered to the steel sheet on the surface of the steel sheet without a primer or anticorrosive pigment;
   (c) electrostatically planting fibers into the fiber planting layer while the surface of the fiber planting layer retains adhesion;
   (d) winding up the extending steel sheet after the fibers have been electrostatically planted continuously on the surface of the steel sheet;
   (e) wherein the fiber planting operation is carried out such that the fibers are planted so that the roots of the said fibers are situated at an intermediate depth position of the fiber planting layer thickness; and
   (f) a fiber planting voltage is controlled to 10 to 80 kv, and the viscosity of the adhesive composition for planting fibers is adjusted to 200 to 20,000 cps/° C. to ensure that the fibers do not extend through the fiber planting layer and do not contact the surface of the surface treated steel sheet.

4. The process for producing an electrostatically fiber planted continuous steel sheet of claim 3, wherein in the coating step, said aqueous adhesive composition for planting fibers comprising said emulsion resin having a glass transition temperature of −40 to 40° C. as an essential ingredient and containing 0 to 20 parts by weight of an aqueous coloring pigment dispersion, 0 to 3 parts by weight of a defoamer, 0 to 5 parts by weight of a pH modifier, 0 to 10 parts by weight of a thickener, and 0 to 20 parts by weight of a water-soluble resin added as optional components based on 100 parts by weight of the resin.

5. The process for producing an electrostatically fiber planted continuous steel sheet of claim 3, wherein in the coating step, said aqueous adhesive composition for planting fibers comprising said emulsion resin having a glass transition temperature of −40 to 40° C. as an essential ingredient also containing up to 20 parts by weight of an aqueous coloring pigment dispersion, up to 3 parts by weight of a defoamer, up to 5 parts by weight of a pH modifier, up to 25 parts by weight of a thickener, and up to 20 parts by weight of a water-soluble resin added as optional components based on 100 parts by weight of the resin.

6. A process for producing an electrostatically fiber planted steel sheet by a fiber planting operation, comprising:
   providing a surface treated steel sheet having a surface to be coated;
   directly coating the treated surface of said steel sheet with a roll coater, spray or applicator with an aqueous adhesive composition for planting fibers consisting of an emulsion resin having a glass transition temperature of −40 to 40° C., 0 to 20 parts by weight of an aqueous coloring pigment dispersion, 0 to 3 parts by weight of a defoamer, 0 to 5 parts by weight of a pH modifier, 0 to 25 parts by weight of a crosslinking agent, 0 to 10 parts by weight of a thickener and 0 to 20 parts by weight of a water-soluble resin based on 100 parts by weight of the emulsion resin to form a fiber planting layer tightly adhered to the steel sheet without a primer containing anticorrosive pigment on the surface of the steel sheet; and
   electrostatically planting fibers into the fiber planting layer while the surface of the fiber planting layer retains adhesion;
   wherein the fiber planting operation is carried out such that the fibers are planted so that the roots of the fibers are situated at an intermediate depth position of the fiber planting layer thickness; and
   a fiber planting voltage is controlled to 10 to 80 kv, and the viscosity of the adhesive composition for planting fibers is adjusted to 200 to 120,000 cps/25° C. to ensure that the fibers do not extend through the fiber planting layer and do not contact the surface of the surface treated steel sheet.

7. A process for producing an electrostatically fiber planted continuous steel sheet comprising:
   unrolling a rolled surface treated steel sheet having a surface to be coated, and straightening out the steel sheet;
   directly coating the surface treated steel sheet to be coated with an aqueous adhesive composition for planting fibers, said aqueous adhesive composition consisting of an emulsion rein having a glass transition temperature of −40 to 40° C., 0 to 20 parts by weight of an aqueous coloring pigment dispersion, 0 to 3 parts by weight of a defoamer, 0 to 5 parts by weight of a pH modifier, 0 to 25 parts by weight of a crosslinking agent, 0 to 10 parts by weight of a thickener and 0 to 20 parts by weight of a water-soluble resin based upon 100 parts by weight of the resin, so as to form a fiber planting layer tightly adhered to the steel sheet on the surface of the steel sheet without a primer containing anticorrosive pigment; and
   electrostatically planting fibers into the fiber planting layer while the surface of the fiber planting layer retains adhesion;
   winding up the steel sheet after the fibers have been electrostatically planted continuously on the surface of the steel sheet;
   wherein the fiber planting operation is carried out such that the fibers are planted so that roots of the fibers are situated at an intermediate depth position of the fiber planting layer thickness; and
   a fiber planting voltage is controlled to 10 to 80 kv, and the viscosity of the adhesive composition for planting fibers is adjust to 200 to 20,000 cps/25° C. to ensure that the fibers do not extend through the fiber planting layer and do not contact the surface of the surface treated steel sheet.

* * * * *